United States Patent Office 3,092,595
Patented June 4, 1963

3,092,595
METHOD OF FORMING BODIES OF FRICTION MATERIAL
Frank W. Smith, Hackensack, Richard H. Gilbert, Ramsey, and Edgar F. Sewell, Wyckoff, N.J., assignors to American Brake Shoe Company, a corporation of Delaware
No Drawing. Filed Apr. 2, 1958, Ser. No. 725,779
4 Claims. (Cl. 260—3)

This invention relates to improvements in the composition of mixtures of materials which may be formed into coherent bodies having desirable friction properties, to a unique formed intermediate article or blank composed of such a mixture and to a process for preparing such friction bodies.

More particularly, this invention relates to a composition of matter particularly adapted to be formed into friction elements of the kind used in brakes, clutches and similar devices and which are particularly useful in the brakes of automotive vehicles and the like. In general, the materials to which this invention is directed comprise a mixture of fibrous asbestos, friction modifiers, fillers and a thermosetting organic binder which may be consolidated and hardened by a curing treatment involving the application of heat and, usually, the simultaneous application of pressure. As is well known in the art, bodies of such friction material have been formed from two general groups of materials which have been compositionally distinguishable and each general group has been amenable to a single distinct forming process. These two processes have been generally identified by the character of the raw mixture prior to the forming operation, i.e., the so-called "wet mix" process and the "dry mix" process.

In the wet mix process, the several ingredients are milled together and a quantity of a solvent such as an alcohol, or alcohols, or naphtha with or without aromatic additives or other liquid having the property of putting a significant amount of the binding ingredient into solution is added thereto. This semi-plastic material is then formed by a continuous or semicontinuous process such as rolling or calendering or extrusion into an elongated coherent body comprising an intermediate or blank having a substantially stable cross-sectional area and configuration and sufficient "green" strength to permit handling and, if desired, coiling without damage thereto.

The intermediate or blank bodies so-produced are referred to in the art as "preformed" bodies or simply "preforms" and have a density of about 75% to 95% of the final cured body. These preformed bodies are then usually cut to final size and shaped by bending, if desired, and, after removing substantially all the volatile solvent therefrom by drying, are subjected to a heating, and if desired, a pressing treatment to effect the curing of the binding material.

As the industrial arts which utilize such friction materials have developed, a demand for better friction materials has resulted, particularly with regard to the life or durability of these materials, their frictional efficiency and their resistance to "fade," which latter property may be defined as a loss of friction during operation usually due to the generation of heat. This is thought to involve the thermal decomposition of one or more of the ingredients and is related to the ability of the friction body to withstand heat. In order to improve certain properties of these materials, it has been found advantageous to incorporate relatively large quantities of shredded soft rubber and larger quantities of a pulverulent derivative of polymerized cashew nut shell liquid into the mix. Unfortunately, when more than about 3 to 7 parts per 100, depending on the solvent used, of the shredded soft rubber and more than about 8 parts per 100 of the cashew nut shell derivative are incorporated into the mix and the usual solvents are added to form a conventional wet mix, the particles of soft rubber become very slippery and swell and the cashew nut shell derivative particles swell. These two phenomena render the resulting wet mix unsatisfactory for either rolling or calendering or extrusion forming operations. The so-called "dry mix" process was then evolved to manufacture friction bodies of these formulations and prior to this invention, has been the only known way in which these formulations may be satisfactorily processed.

In the dry mix process, appropriate amounts of the dry ingredients including asbestos fiber, shredded soft rubber, particulate cashew nut shell derivative and a powdered resin and/or elastomer binder are thoroughly mixed. It should be noted that these mixtures may also contain particles of metal, metallic oxides, abrasives and other fillers or friction modifying or augmenting additives known in the art. This comminuted material is flocculent in appearance and is composed essentially of a mixture of fibrous particles of asbestos, small shreds of soft rubber and small particles of the cashew nut shell derivative and small particles of the binder. No liquids are added to this mixture. The mixture is then formed into a coherent body by first subjecting it to a warm or hot pressing operation to form an intermediate sheet-like, relatively friable, intermediate or blank. During this pressing operation, care must be exercised to prevent exposure of the material to too high a temperature for too long a period of time, since the object of this step is to produce an intermediate or preformed body which has just sufficient strength to withstand handling and elementary forming operations such as bending, but during which treatment the thermosetting organic binder has not undergone any substantial advancement of the bond. The resulting preformed body is porous and has a density of about 30% to 50% of the final body.

This preformed body may then be cut to size and shape, subjected to bending operations, confined in a die and subjected to heat and pressure to accomplish densification and to insure the complete curing of the binder ingredient.

There are, unfortunately, several manufacturing difficulties encountered in the practice of this "dry mix" process. Of these difficulties, the most important have their origin in the characteristics of the dry mix itself.

It is desirable that the preformed bodies formed by the initial pressing operation have a constant or substantially constant thickness as between individual and successively formed preformed bodies in order that they may be subsequently processed in the same manner by the same or identical apparatus. In addition, each preformed body must have a substantially constant density throughout its volume and the gross density of each preformed body should be substantially identical to each other preformed body. Furthermore, it is obvious that while the comminuted dry mix is composed of heterogeneous materials, it is desirable that the mixture be homogeneous in character, in that the various ingredients should be substantially uniformly distributed therethrough and any segregation or concentration of any one or ones of the ingredients in particular zones or localities in the mix and hence in the resulting preformed bodies, is a condition to be avoided.

In the accepted commercial practice of the dry mix process, it has been found that the best way of insuring an acceptable degree of constancy of quality and uniformity of the preformed bodies is by pressing substantially equal amounts, on a weight basis, of the dry mix to a predetermined volume. This is best accomplished in a mold or closed die to form a substantially planar sheet-like body into which mold a predetermined weight of the dry mix is introduced, uniformly distributed therein and then pressed. It has been found that the powdered ingredients of these dry mixes, i.e., the cashew nut shell derivative, the metal particles, the metallic oxides, the abrasives and the like exhibit a marked tendency to segregate from the fibrous asbestos and the shredded soft rubber if they are agitated, subjected to vibration or handled excessively after the mix has been prepared. Therefore, automatic weighing equipment or apparatus cannot be used since this apparatus, when designed to handle pulverulent dry material, almost invariably moves or otherwise handles the material to be weighed by means of, or in conjunction with, either vibration or agitating movements. Therefore, manual weighing of mix for each preformed body is necessary. Yet further, the dry mix exhibits a marked tendency to "bridge" or form rather large voids or internal areas or zones wherein the amount of mix is less than that contained in adjacent zones of comparable volume. Since the material cannot be agitated to correct this poor distribution in the mold without segregation of the ingredients and these "bridged" zones are not usually visually apparent to the press operator, this defective distribution of the mix is not corrected in many instances. During the pressing operation which follows, the temperature of the mix is raised to a point at which the thermosetting binder just begins to melt, and of course chemically to react to form the cured phase, and only sufficient pressure is applied for as short a time as possible to stick the material together to form a preformed body having sufficient strength to permit handling. Obviously, under these conditions, there is virtually no flow of material within the body to cause any substantial equalization of density between the voids and the denser zones. It has been found that these voids or grossly lower density zones in the preformed bodies are not materially affected by the final hot pressing operation and remain as areas or zones of significantly lower density in the final body. Defects of this type, even under the most carefully controlled production techniques, can account for over a 10 percent rejection of final bodies. In addition, the minimum practical thickness of bodies made by the conventional dry mix process is about 0.150 inch thick at the preform stage and about 0.075 inch thick in the final form.

From the foregoing, it will be apparent that it would be desirable to be able to form these dry mix materials in a continuous manner, such as by rolling, calendering or extrusion forming, to eliminate the time-consuming hand-weighing step, to eliminate the tendency of certain of the constituents to segregate and to eliminate the formation of voids during the initial compacting step, whereby not only would the rate of production of finished bodies be increased and accomplished more economically, but the uniformity and hence the overall quality of the product improved with an attendant decrease in the number of defective bodies produced.

A principal object of this invention is the provision of a process whereby dry mix friction compositions may be adapted to a continuous or semi-continuous forming process for the manufacture of friction bodies having a high degree of uniformity.

A yet further object of this invention is the provision of an improved intermediate or preformed body having a high "green" strength and in which the thermosetting organic binder has not been heated to initiate the chemical curing or hardening reaction.

Other and specifically different objects of this invention will become apparent to those skilled in the art from the detailed disclosure which follows.

Briefly stated, in accordance with one aspect of this invention, friction elements having the aforementioned desirable high friction properties are formed by providing a pulverulent dry mixture consisting essentially of up to about 75 percent and preferably from about 10 to 70 percent by weight asbestos fiber, up to about 15 and preferably from about 3 to 15 percent by weight shredded soft rubber, up to about 25 percent and preferably from about 4 to 20 percent by weight pulverulent cashew nut shell derivative, from about 10 to about 22 percent and preferably from about 17 to 20 percent by weight of a powdered thermosetting organic binder, and up to about 70 percent by weight of other fillers and friction augmenting or modifying agents, which fillers and friction agents may comprise, for example, up to about 20 percent by weight of powdered metallic oxides, up to about 50 percent by weight of metal or alloy particles, up to about 30 percent by weight of powdered minerals, usually not more than about 3 percent by weight of powdered abrasives (materials having a Mohs hardness of 8 or greater), adding a sufficient quantity of an aqueous "tackifier" solution to the substantially homogeneous dry mixture to permit the mixture to be formed at room temperature by rolling, calendering or extrusion processes into a strip or sheet-like body having a sufficiently high green strength to permit handling, cutting and shaping operations to form so-called preformed bodies and curing the preformed bodies under heat and pressure to form the final high density friction bodies.

The aqueous tackifier solution referred to previously is compositionally and functionally quite different from the liquid constituent of the conventional, prior art, "wet mix." As stated previously, the prior art liquid constituent of the old wet mixes was necessarily a solvent for the binder of the mix. Unfortunately, such solvents invariably were absorbed by and adsorbed upon the cashew nut shell derivative and the soft rubber constituents, imposing an upper limit upon the amount of these ingredients which could be used. The aqueous tackifier solution of the present invention is not a solvent to any measurable degree with the binder and is inert with respect to the cashew nut derivative and rubber constituents. In operation, the tackifier solution coats the particles comprising the mix thereby providing each particle with an external coating which is "sticky," i.e., has adhesive properties while wet, causing them to tend to adhere to each other. This property effectively prevents segregation of the constituents. The adherence, however, is not so great as to prevent rolling or calendering or extrusion of the mix and also, therefore permits agitation of the mix just prior to such forming operation whereby voids or extensive low density zones are eliminated in the preformed bodies produced by these forming operations.

After the tackified mix is formed into coherent bodies by these continuous or substantially continuous operations, the bodies and preformed bodies made therefrom are subjected to environments and treatments which tend to remove substantially all the water from the tackifier solution, leaving the solute of the tackifier solution in a substantially solid form. This residual dry solute must not lose its adhesive qualities before the bodies are subjected to the curing procedure nor should it form a liquid phase after the curing process when subjected to temperature normally encountered during use.

In order to more completely disclose the invention, the following examples are presented.

A tackifier solution composed of about 10 percent by weight of a commercially obtained hydroxyethylether derivative of corn starch, about 22 percent by weight of a commercially obtained emulsion of an acid-containing, cross-linked, acrylic copolymer which contains about 28 percent by weight solids, about 10 percent by weight of an aqueous solution of sodium hydroxide, containing 10 percent by weight sodium hydroxide, and the balance of the solution being substantially all water was prepared. The pH of the solution was between 8 and 9. If desired, a small amount of a preservative may be added to prevent bacteria and molds from attacking the starch. Furthermore, as is well known, the solution of the starch may be expedited by the addition of a small amount of sodium carbonate monohydrate or the like. In addition, while the term "solution" has been used, it will be understood that this term is intended to included true solutions, as well as colloidal suspensions, such as starch and other technically insoluble organic solutes form in water. Additionally, the terms "solvent" and "solute" are similarly intended to include the water in such aqueous colloidal suspensions and the colloidally suspended particles therein, respectively.

A mixture of dry ingredients having the following approximate composition expressed in weight percent:

Asbestos fiber _____ 41.0
Shredded soft rubber _____ 10.9
Cashew nut shell derivative _____ 10.0
Thermosetting binder _____ 18.5
Other fillers and friction agents _____ Balance was mixed with a sufficient quantity of the foregoing tackifier solution to form a mixture having a consistency suitable for rolling. In general, these materials are blended and mixed in the following manner. The asbestos fiber and resin binder, which in this particular case was a powdered oil-modified phenolic, i.e., a phenol formaldehyde resin with about 20 percent by weight linseed oil, were blended together and set aside. It should be understood that other thermosetting resinous binders may be used equally well, as is well known and understood in the art. For example the use of thermosetting aldehyde condensed resins, both unmodified and oil-modified, such as phenol formaldehyde resins, resorcinol formaldehyde resins, urea formaldehyde resins, melamine formaldehyde resins, cashew nut oil formaldehyde resins and the like are well known and practiced in the art. The tackifier solution was then added to the other dry ingredients and mixed thoroughly. The blended resin and asbestos mixture was then added to the tackifier solution containing the other solids and the entire mass thoroughly mixed to produce a fibrous, uniform consistency characterized by the absence of ball-like masses of agglomerated materials. In mixtures made according to our invention, it has been found that the proportion of the tackifier solution to the friction solids may vary over a substantial range, depending upon several factors. For example, if the mix is to be formed into a flat, relatively thin body, e.g., about ¼ inch thick, as little as 1 percent by weight acrylic solids may be added to the dry friction material ingredients to make a formable product having sufficient green strength, it being understood in terms of this specific example that the acrylic solids are added to the dry friction materials in the form of an alkali salt solution prepared by adding alkali to an acrylic acid emulsion containing about 28 percent by weight solids as previously specified which has a room temperature viscosity of about 4.0 centipoises. If heavier sections are to be formed, and particularly if they are to be coiled, greater amounts of acrylic solids, up to as much as 10 percent by weight may be necessary. It will be appreciated, however, that if a solution of but an acrylic acid salt having the same solid content, but a higher degree of adhesiveness is employed, in general, correspondingly smaller amounts of acrylic solids may be used to obtain similar as-formed properties.

Additionally, the starch ingredient in the tackifier solution may be varied over a sizeable range and under some circumstances, it may be desirable to omit it. Therefore, the starch content may be eliminated entirely or the solution may contain as much as 10 percent by weight, based on the total solids of the friction mix. A particularly advantageous formable composition contains about 1.5 to 2.5 weight percent alkali salt of polyacrylic acid solids and about 3 to 3.5 weight percent starch solids based upon the total solids content of the composition. In this particular example, the sodium salt of polyacrylic acid amounted to about 2 percent by weight of the total solids and the starch amounted to about 3.3 percent by weight of the total solids.

The tackified mixture was then passed between the rolls of a conventional rolling mill and formed at room temperature into a coherent sheet-like body comprising an intermediate or blank about 0.520 inch thick by about 3 inches in width and many feet long. The body thus formed had an apparent density of about 65 percent of theoretical and was sawed into appropriate lengths and each piece bent into an arcuate form, air dried in an oven for about 18 hours at about 150° F., placed in closed molds and the resin binder cured by heating to from 280° to 290° F. for about 15 minutes while being subjected to a pressure of about 2000 pounds per square inch. During this curing operation, the thickness was reduced to about 0.345 to 0.350 inch and near theoretical density (about 95 to 98 percent) was thereby achieved. The cured bodies were then subjected to an unconfined bake by heating in an air atmosphere for about 18 hours at 200° to 350° F. Following this baking treatment, they were then ground to about 0.315 inch thickness.

While the foregoing specific example discloses a particular friction material composition it will be appreciated that there are many variations which may be employed within the scope of the invention. For example, other friction mix compositions found to be suitable are listed in the following table, although no attempt is made to make the list exclusive, but merely exemplary. Also, the term "thermosetting organic binder" will be understood to include resins, elastomers, drying oils and combinations and modifications thereof as is well understood in the art.

*Compositions in Weight Percent*

| | | | | | | | | | | |
|---|---|---|---|---|---|---|---|---|---|---|
| Asbestos Fiber | 51 | 46 | 52 | 70 | 45 | 47 | 65 | 34 | 45 | 17.5 |
| Shredded Soft Rubber | 6 | 3 | 3 | | 3 | 12 | 4.2 | 7 | 3 | |
| Cashew Nut Derivative | 6 | 20 | 14 | 11 | 19 | 4 | 11.6 | 7 | 11 | 4.8 |
| Thermosetting Organic Binder | 20 | 18 | 18 | 19 | 19 | 17.5 | 19.2 | 17 | 15 | 15.3 |
| Other Fillers and Friction Agents | Bal. | Bal. | Bal. | | Bal. | Bal. | | Bal. | Bal. | 1 Bal. |

¹ Includes up to 50% metal powder or chips.

Yet further, while the previously disclosed example of a tackifier solution suitable in the practice of this invention was specific to an aqueous solution of a sodium salt of an acrylic acid copolymer with or without a starch additive, it has been found that other alkali metals, such as potassium, may be substituted for the sodium. In addition, other members of the acrylic family have found suitable as a substitute for the acrylic acid copolymer such as, for example, other acrylic acid polymeric materials and polyacrylamide. Also, it has been found that organic materials other than the acrylics may be used with varying degrees of success as substitutes for the acrylics, such as, for example, other natural and synthetic materials which have wet adhesive properties and are soluble or colloidally dispersed in water. These materials include corn starch per se, wheat starch, tapioca starch, dextrin, carboxylated cellulose, shellacs, glues, salts of polylignin sulfonate and mixtures thereof.

For example, a tackifier solution consisting of animal glue alone in water was found to be satisfactory. In this case, about 4 pounds of animal glue was dissolved in about 18 pounds of warm water and mixed with a dry friction mix consisting of about 51 weight percent asbestos fiber, about 6 percent shredded soft rubber, about 6 percent cashew nut shell derivative, about 20 percent resin binder and the balance fillers and friction agents. Sufficient tackifier solution was added to the dry mix ingredients so that about 4 percent by weight dry glue based on the total dry mix solids content was employed. This mix was then rolled into a coherent body and subjected to forming and curing treatments as previously set forth.

In yet another example, a tackifier solution consisting of about 2 pounds of polyacrylic acid amide was dissolved in 20 pounds of water and mixed with about 100 pounds of dry friction mix solids consisting of about 51 weight percent asbestos fiber, about 6 percent shredded soft rubber, about 6 percent cashew nut shell derivative, about 20 percent resin binder and the balance fillers and friction agents. This mixture was rolled into a coherent body which was found to have a satisfactory stability and strength and was then subjected to forming and curing treatments as previously set forth.

In the processing of these dry mix formulations according to this invention to form coherent "preform" bodies capable of being handled prior to the curing and densification steps, it will be apparent that the various conventional continuous forming procedures discussed previously, i.e., rolling or calendering or extrusion, are all basically functional equivalents. In each case, the tackified mix is subjected to a compacting action as it is passed or fed through an aperture having a fixed configuration and dimension which comprises an open die. In the rolling or calendering operation, this die opening is formed by adjacent surfaces of a pair of forming rolls which is limited in its lateral extent by a pair of collars or the like, as is well known. In the conventional extrusion apparatus, the tackified mix is forced under pressure, by means of either a screw feeding mechanism or by means of a ram, through a die-opening of fixed dimension and configuration, the opening or aperture generally being cut in a metal plate or the like. Thus it will be appreciated that whether roll forming or conventional extrusion forming is used, the forming operation is essentially one which is continuous in nature and in which the non-compacted tackified dry mix is caused to pass through an aperture wherein it is subjected to pressure causing it to be compacted into a coherent substantially elongated body having a substantially constant transverse cross section, which cross section is geometrically and dimensionally similar, if not identical, to the aperture through which it was passed, a procedure fundamentally different from the closed-die forming procedure of the prior dry mix art. Additionally, it is to be understood that while for the purposes of disclosing an operative process for practising the invention, coating the particles of the dry mix has been disclosed as accomplished by mechanically mixing the particles with the tacky solution, it will be appreciated by those skilled in the art that any other specific way of providing a surface coating or film on said particles may be employed, such as, for example, by spraying, dipping, or any other functionally equivalent manner.

In the employment of these continuous or substantially continuous forming operations, it is not infrequently desirable to provide means for coiling or winding the compacted, elongated body as it is produced. It has been found that such bodies must have a high "green" strength to withstand such coiling or winding operations without cracking or breaking. It has been found, according to this invention; that if such a freshly formed green body, about 0.5 inch thick, can be bent or wound about a cylindrical reel about 9 inches in diameter without cracking or breaking, that the body possesses a sufficiently high green strength. As indicated previously, if a rolled body is to be coiled as it is formed, particularly if it is formed by rolling, it has been found that the order in which the constituents of the mix are added to the tackifier solution is significant. It should be understood that it is desirable to add as little water, in the tackifier solution, to the dry mix as is compatible with adequate rolling properties and subsequent handling strength since the added water must be removed during the treatments between the forming operation and the curing and densification steps. Yet further, the amount of tackifier solids which are to be added to the dry mix constituents should be held to a minimum in order that the frictional properties of the final body not be adversely affected. It has been found that if all or substantially all of the dry mix ingredients except the asbestos fiber is first mixed with the tackifier solution and then the asbestos added, the amounts of water and tackifier may be held to a minimum consistent with adequate forming and coiling properties of the preform. In practice, it has been additionally found that the dry thermosetting organic binder may be mixed with the dry asbestos fiber, as previously set forth, the other dry mix ingredients mixed with the tackifier solution and then the asbestos and binder added to produce a good distribution of the binder. If the entire dry mix is mixed with the tackifier, much higher amounts of tackifier solids and water are required to produce a mixture having equivalent rolling characteristics and a preform body made therefrom having an equivalent strength and coilability. It has been additionally found that where coiling or winding of the so-produced body is not contemplated, that smaller amounts of the tackifier may be employed in aqueous solution. For example, if the body is to be produced in a flat intermediate form, a tackifier solution containing only starch and water may be used. If the body is to be subjected to a substantial amount of handling, however, the addition of a small amount of acrylate resin or an equivalent tackifying material as previously disclosed is desirable.

It will also be appreciated by those skilled in the art that by providing means whereby conventional dry mix formulations may be formed by rolling or calendering apparatus, this invention thereby provides a means whereby metallic reinforcements, usually in the form of a continuous strip of metallic wire cloth, may be passed through the rolls concurrently with the friction mix whereby the strip or sheet-like body is formed with an integral, embedded wire screen or cloth reinforcement. This type of reinforcement is difficult and usually considered impractical to provide for bodies made by the conventional dry mix processes.

While this invention is particularly useful for forming coherent bodies by continuous or substantially continuous forming procedures from pulverulent friction compositions which have heretofore only been formable by conventional, batch-type dry mix procedures, it will be appreciated that closed-die forming may also be advantageously employed within the scope of the invention. In this regard, the procedure differs from the conventional dry mix forming procedure principally in that it may be accomplished cold, i.e., at about room temperature, since the compacted preformed body thus formed has a strength equivalent to, or greater than, preformed bodies formed by the conventional hot pressing technique, previously discussed, employed for dry mixes. According to our invention, such preformed bodies owe their strength to the bonding properties of the tackifier and not, as in the conventional dry mix process, to a partial heat curing of the thermosetting organic binder. Additionally, in this regard, if the conventional dry mix formulations are pressed in a closed die without heat and without the tackifier of this invention, the body formed thereby is extremely friable and cannot be satisfactorily handled.

From the foregoing, it will therefore be apparent that this invention, at least from one aspect thereof, provides means whereby more or less conventional dry mix friction material formulations:

(1) May be formed into coherent, uncured, dimensionally stable bodies having high green strength by a continuous forming process; i.e., by rolling, calendering or extrusion;

(2) That such bodies are formed and the constituent particles thereof held together at room temperature and hence the ultimate resin binder constituent is not caused to react or harden during the forming operation; and, (3) That such bodies are homogeneous in constituency and density.

In contrast, in order to produce preform bodies capable of being handled in subsequent processing by the conventional dry mix processing:

(1) Has required a batch-type pressing operation involving manual weighing of individual pressing batches to minimize segregation and to attempt to produce consistent densities between individual bodies so-produced;

(2) Has involved hot pressing of such mixes whereby a portion of the resinous binder is caused to react or partially react in order to cause the particles to adhere to each other; and (3) Has been characterized by a tendency to "bridge" in the mold and for certain particulate constituents to settle out or to segregate whereby the formed bodies have had a variable density from point to point within the bodies and have had an undesirable segregation of certain constituents.

As has been previously pointed out, the several benefits flowing from this invention are dependent at least in part upon the coaction of the several ingredients of the dry mix of the friction material formulation and the tackifier solution. Some of the considerations which are contemplated within the purview of this invention may be summarized as follows:

The constituents of the friction mix before the tackifier solution is added are particulate in form and are dry. These constituents include asbestos fiber and heat curable resinous binder as essential ingredients and, preferably, relatively large quantities of shredded soft rubber or cashew nut shell derivative or both, and may contain other fillers and friction augmenting agents.

The tackifier solution is essentially composed of a water soluble solute and water. The tackifier solution must not react with the dry mix constituents in any way except to wet the surfaces of the constituent particles and to produce a surface coating or film thereon which has adhesive properties in both the wet and dry states.

The tackifier solution solute, after the final baking and curing processes, must not leave a residue in the finished friction article which forms a liquid phase under the normal operating conditions to which the friction article may be subjected in service.

While in the foregoing disclosure, certain specific materials, combinations of materials, and processing steps have been set forth as illustrative of this invention, these disclosures will immediately suggest other and specifically different materials and process modifications to those skilled in the art which fall within the broader aspects of the invention. It is therefore intended that these several specifically disclosed materials and processes be regarded as illustrative only and that the invention not be limited thereto nor in any other way except as defined by the appended claims.

What we claim as new and desire to secure by Letters Patent of the United States is:

1. The method of forming bodies of friction material comprising the steps of preparing a dry mixture of particles consisting essentially of, by weight, up to 70 percent of asbestos fiber, from about 10 to about 22 percent of a powdered thermosetting aldehyde condensed organic binder consisting essentially of a substantially water insoluble organic polymer and a curing agent to convert said organic polymer to the thermoset condition, up to about 15 percent shredded soft rubber and up to about 25 percent pulverulent cashew nut shell derivative, coating substantially each water insoluble particle of said mixture with a surface film of an aqueous solution of an organic solute which is sticky whereby said particles tend to adhere to each other, mixing said mixture to form a low density mass having a uniform fibrous consistency, forming said low density mass into an elongated coherent, partially densified, substantially stable body having a predetermined cross sectional configuration and dimension by passing said mass in a substantially continuous manner through an aperture having a configuration and dimension substantially identical to that of the cross section of said formed body while applying pressure to said mass, said elongated, coherent, partially densified body so-produced having sufficient mechanical strength to permit it to be handled unsupported and sufficient flexibility that it may be bent about a radius without breaking or cracking, removing substantially all the solvent water from said aqueous solution without substantially reducing the adhesive properties of the residual solid solute, and curing said binder by heat and pressure treatment to effect substantially full densification of said body, the solid residue of said organic solute in said cured body remaining in the solid state during normal operating conditions to which such friction materials are subjected in service.

2. The method of forming bodies of friction material comprising the steps of preparing a dry mixture of particles consisting essentially of, by weight, up to 70 percent asbestos fiber, up to about 15 percent shredded soft rubber, up to about 25 percent pulverulent cashew nut shell derivative, up to about 70 percent of fillers including friction modifying agents, from about 10 to about 22 percent powdered thermosetting aldehyde condensed organic binder consisting essentially of a substantially water insoluble organic polymer and a curing agent to convert said organic polymer to the thermoset condition, coating substantially each water insoluble particle of said mixture with a liquid surface film consisting essentially of from about 5 to 50 percent by weight of an adhesive material selected from the group consisting of alkali metal salts of acrylic acid polymeric materials, polyacrylic acid amide, starches, glues, dextrin, carboxylated cellulose, shellacs, salts of polylignin sulfonates and mixtures thereof with the balance of said film consisting essentially of water, which film is sticky whereby said particles tend to adhere to each other, mixing said mixture of coated particles to form a low density mass having a uniform fibrous consistency, forming said low density mass into an elongated, coherent, partially densified, substantially stable body having a predetermined cross sectional configuration and dimension by passing said mass through an aperture having a configuration and dimension substantially identical to that of the cross section of said formed body while applying pressure to said mass, said elongated, coherent, partially densified body so-produced having sufficient mechanical strength to permit it to be handled unsupported and sufficient flexibility that it may be bent about a radius without breaking or cracking, removing substantially all the water from said aqueous surface film without substantially reducing the adhesive properties of the residual solid adhesive material and curing said binder by heat and pressure treatment to effect substantially full densification of said body, the solid residue of said adhesive material in said cured body remaining in the solid state during normal operating conditions to which said body may be subjected in service as a friction material.

3. The method recited in claim 1 in which said dry mixture consists essentially of from about 10 to 70 percent by weight asbestos fiber, from about 3 to 15 percent shredded soft rubber, from about 4 to 20 percent pulverulent cashew nut shell derivative, from about 17 to 20 percent of said powdered thermosetting organic binder and the balance up to about 70 percent of fillers and friction augmenting agents.

4. The method of forming bodies of friction material as recited in claim 1 in which said aqueous solution consists essentially of a water soluble solute selected from the group consisting of alkali metal salts of acrylic acid polymeric materials, polyacrylic acid amide, starches, glues, dextrin, carboxylated cellulose, shellacs, salts of polylignin sulfonate and mixtures thereof dissolved in water to form a solution containing from about 5 percent to 50 percent by weight of solute and adding a sufficient amount of said solution to the dry friction material so that the total solute content of the resulting mixture amounts to from about 1 percent to about 10 percent by weight of the total solids content.

References Cited in the file of this patent

UNITED STATES PATENTS

| | | |
|---|---|---|
| 2,309,571 | Bruce et al. | Jan. 26, 1943 |
| 2,472,247 | Coleman | June 7, 1949 |
| 2,534,607 | Laher et al. | Dec. 19, 1950 |
| 2,536,136 | Lucid | Jan. 2, 1951 |
| 2,877,198 | Morrissey | Mar. 10, 1959 |

OTHER REFERENCES

Delmonte: The Technology of Adhesives, Reinhold Publishing Corp., New York, 1947, pages 8 and 9.